(12) United States Patent
Brunet et al.

(10) Patent No.: US 9,879,607 B2
(45) Date of Patent: Jan. 30, 2018

(54) SEALING OF TURBINE ENGINE ENCLOSURES PRODUCED BY BRUSH SEAL AND LABYRINTH

(71) Applicant: SNECMA, Paris (FR)

(72) Inventors: Antoine Robert Alain Brunet, Avon (FR); Delphine Leroux, Samois sur Seine (FR); Gilles Aouizerate, Chennevieres-sur-Marne (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/095,072

(22) Filed: Dec. 3, 2013

(65) Prior Publication Data
US 2014/0300058 A1 Oct. 9, 2014

(30) Foreign Application Priority Data

Dec. 5, 2012 (FR) ..................................... 12 61694

(51) Int. Cl.
*F02C 7/28* (2006.01)
*F01D 11/02* (2006.01)
*F01D 25/16* (2006.01)

(52) U.S. Cl.
CPC ............... *F02C 7/28* (2013.01); *F01D 11/02* (2013.01); *F01D 25/162* (2013.01); *F05D 2240/56* (2013.01); *Y02T 50/671* (2013.01)

(58) Field of Classification Search
USPC .................. 277/345, 355, 412; 415/111, 230
See application file for complete search history.

(56) References Cited

U.S. PATENT DOCUMENTS

| 4,468,066 | A | * | 8/1984 | Alcorta et al. | ................ 384/462 |
| 4,497,172 | A | * | 2/1985 | Smith | ........................ 60/226.1 |
| 4,541,741 | A | * | 9/1985 | Woodbridge et al. | ........ 384/482 |
| 4,683,714 | A | * | 8/1987 | Thebert | .......................... 60/772 |
| 6,390,476 | B1 | * | 5/2002 | Tong et al. | .................... 277/355 |
| 6,609,888 | B1 | * | 8/2003 | Ingistov | ........................ 415/231 |
| 6,854,735 | B2 | * | 2/2005 | Sarshar et al. | ................ 277/355 |
| 8,707,711 | B2 | * | 4/2014 | Tanimura | ....................... 60/805 |

(Continued)

FOREIGN PATENT DOCUMENTS

| EP | 1 270 876 A2 | 1/2003 |
| EP | 1 724 445 A2 | 11/2006 |
| EP | 2 009 333 A1 | 12/2008 |

OTHER PUBLICATIONS

French Preliminary Search Report dated Sep. 5, 2013 in French 12 61694, filed on Dec. 5, 2012 ( with English Translation of Categories of Cited Documents).

*Primary Examiner* — Eugene G Byrd
(74) *Attorney, Agent, or Firm* — Oblon, McClelland, Maier & Neustadt, L.L.P.

(57) ABSTRACT

A sealing device for an enclosure of a turbine engine formed by an assembly of juxtaposed rotating and/or static bodies is provided. The sealing device includes at least one brush seal having a brush body, carried by at least one first member, and bristles extending from the brush body and arranged so as to rub against at least one second member rotatable relative to the first member, so as to produce a pressure difference between the inside of said enclosure and its outer environment. The device further includes a labyrinth-type seal, the labyrinth being positioned in series with the brush seal between the inside of the enclosure and its outer environment.

10 Claims, 3 Drawing Sheets

(56) References Cited

U.S. PATENT DOCUMENTS

| | | |
|---|---|---|
| 2002/0192074 A1 | 12/2002 | Turnquist et al. |
| 2003/0102629 A1* | 6/2003 | Bhate et al. .................. 277/355 |
| 2004/0036227 A1* | 2/2004 | Sarshar et al. ................ 277/355 |
| 2004/0046327 A1* | 3/2004 | Menendez et al. ............ 277/412 |
| 2004/0094900 A1* | 5/2004 | Turnquist et al. ............. 277/355 |
| 2004/0100033 A1* | 5/2004 | Tong et al. .................... 277/411 |
| 2005/0017458 A1* | 1/2005 | Turnquist et al. ............. 277/412 |
| 2005/0073106 A1* | 4/2005 | Thermos et al. .............. 277/413 |
| 2006/0006603 A1* | 1/2006 | Dalton et al. ................. 277/411 |
| 2006/0251512 A1 | 11/2006 | Singh et al. |
| 2007/0114727 A1* | 5/2007 | Greif et al. ................... 277/355 |
| 2008/0001363 A1* | 1/2008 | Bhate ........................... 277/355 |
| 2008/0217859 A1* | 9/2008 | Addis ........................... 277/303 |
| 2009/0001668 A1 | 1/2009 | Plona |
| 2009/0066033 A1* | 3/2009 | Lusted et al. ................. 277/411 |
| 2009/0302543 A1* | 12/2009 | Ruggiero et al. ............. 277/303 |
| 2009/0324388 A1 | 12/2009 | Takamura et al. |
| 2011/0072831 A1* | 3/2011 | Tanimura ........................ 60/805 |
| 2011/0309585 A1* | 12/2011 | Uehara et al. ................ 277/352 |

* cited by examiner

SEALING OF TURBINE ENGINE ENCLOSURES PRODUCED BY BRUSH SEAL AND LABYRINTH

BACKGROUND OF THE INVENTION

Field of the Invention

The field of the present invention is that of turbine engines and, in particular, that of sealing devices between their fixed parts and rotating parts.

Description of the Related Art

A turbine engine for an aircraft generally comprises, from upstream to downstream in the direction of gas flow, a fan, one or more compressor stages, for example a low-pressure compressor and a high-pressure compressor, a combustion chamber, one or more turbine stages, for example a high-pressure turbine and a low-pressure turbine, and a gas exhaust nozzle. For each compressor there can be a turbine, the two being connected by a shaft, thus forming, for example, a high-pressure core and a low-pressure core.

It generally comprises, substantially level with the upstream end of the high-pressure core, an "upstream enclosure" and also, substantially level with the downstream end of the high-pressure core, a "downstream enclosure", both containing bearing- and gear-type members, which are lubricated by oil. The oil, sprayed by the rotating parts, forms a mist of suspended droplets there. These upstream and downstream enclosures are formed and delimited by walls of the fixed structure of the turbojet engine but also by walls of rotating elements. Furthermore, they have to allow the passage through them of an air flow, particularly for ventilation purposes, but they also have to retain as much oil as possible within them, which is why the sealing between the fixed and rotating elements of an oil enclosure is a particularly tricky problem.

Traditionally, sealing was achieved by using labyrinth-type seals, which is the simplest, strongest and most widespread sealing solution for turbine engines. Such a seal comprises, on the one hand, knife-edge seals, or thin ribs, which are integral with a rotating part and, on the other hand, an abradable material, positioned facing the knife-edge seals, which is integral with a fixed part. The knife-edge seals rub against the abradable material, into which they sink so as to form grooves acting as baffles for the ventilation air. This friction rub takes place with a certain amount of play, to allow a flow of gases from one of the compressors of the turbine engine, these gases then preventing the oil from leaving via the labyrinth seal. The gas flow rate is generally at a level sufficient for idling and is hence excessive in the other flight phases, in which the flow rate of air taken in by the fan of the turbojet engine is greater and the pressure within the turbine engine is higher. This flow being excessive in the other flight phases has at least two harmful consequences: first, it reduces the efficiency of the engine and, next, it tends to drive a larger amount of oil out of the enclosure, towards oil separators. The turbine engine thus consumes oil, which is costly and also harmful to the environment.

The idea of replacing the labyrinth seals with "brush"-type seals has therefore emerged. A brush seal generally comprises an annular brush body fitted to a fixed part, which is extended by two walls capturing a plurality of substantially radially juxtaposed bristles, which can, for example, be made of carbon. They are fastened at a first end into the brush body and their second ends are free and in contact with a rotating part, the bristles preferably being slightly slanted in the direction of rotation of the rotating part. Such brush seals, examples of which are given in patent applications FR 2918144 or FR 2957976 made by the applicant, have the advantage of requiring a flow of gas passing through them, at a rate that is not too great to ensure their oil-tightness. A carbon brush seal is more effective than a labyrinth seal but, although it allows very high-performance sealing to be achieved at low to medium pressures, while remaining relatively simple and strong, it still has the major drawback of having a mediocre sealing ability at high pressures.

It is therefore advisable to improve the sealing devices of turbine engines between their rotating and static portions, or between two rotating portions, or else between two static portions, so as to reduce losses therefrom, to improve the performance and safety of turbine engines. These sealing devices must, specifically, be particularly high-performance for the bearing enclosures, which are lubricated. Indeed, if the lubricating liquid leaks out of the enclosure, there is a risk of starting a fire, causing imbalance in the rotating portions or contaminating the air going to the aircraft cabin. If too great a flow of hot air gets into the lubricated enclosure there is then the risk of the bearing and its lubricant becoming heated to an unacceptable degree. The sealing devices must, among other things, have high performance so as to limit air leaks, which will not contribute to the efficiency of the turbine engine, and thus improve its overall performance.

Various devices have been proposed, involving a combination of a labyrinth seal placed in series with a brush seal, as described in patent applications EP 1270876 or EP 1724448. However, these devices have the drawback that oil can spread into the labyrinth seal, which detracts from the effectiveness of the sealing device.

BRIEF SUMMARY OF THE INVENTION

The aim of the present invention is therefore to overcome these drawbacks by proposing an improved sealing device for a turbine engine, which is effective at slow speeds and retains good effectiveness at higher speeds and with a smaller risk of the labyrinth seal becoming polluted by oil.

To this end, the subject-matter of the invention is a sealing device for an enclosure for lubricating the bearings of a rotating shaft of a turbine engine formed by an assembly of juxtaposed rotating and/or static bodies, the sealing device comprising at least one brush seal having a brush body, carried by at least one first member, and bristles extending from said brush body and arranged so as to rub against at least one second member rotatable relative to the first member, so as to produce a pressure difference between the inside of said enclosure and its outer environment, said device further comprising a labyrinth-type seal having at least one knife-edge seal extending from said first or second member and cooperating with an abradable material carried respectively by said second or first member, said labyrinth being positioned in series with said brush seal between the inside of said enclosure and its outer environment, characterised in that the labyrinth seal is positioned entirely on the side with higher pressures relative to the brush seal.

The combination in series of a labyrinth seal and a brush seal, by calibrating the leakage flow passing through the sealing device at idling, allows leakage flows to be kept low at the highest speeds. The efficiency of the turbine engine is therefore not affected by implementing the function of sealing the enclosures in this configuration. Moreover, since the labyrinth seal is positioned, relative to the brush seal, on the side with higher pressures, the brush seal is then put in optimal conditions to ensure sealing, the pressure difference between its upstream and downstream being small even at high rotation speeds.

Preferably, the brush seal is a seal with carbon fibre bristles. This type of seal performs well at idling and, because of the flexibility of its bristles, causes very little wear on the parts against which it rubs. On the other hand, this flexibility is harmful for the sealing function but this drawback is compensated for by the introduction of a labyrinth seal, which is placed in series with the carbon brush seal.

In a preferred embodiment the labyrinth seal has only one knife-edge seal. This configuration has the advantage of simplicity, smaller overall dimensions and lower mass, while remaining very effective from the point of view of sealing.

In a preferred embodiment the first member is a fixed cylindrical wall, the second member being a rotating cowl.

More preferably, said fixed wall has a boring within which the brush body is positioned, and an axial extension forming a circular crown carrying said abradable material.

Even more preferably, said rotating member has a cylindrical face positioned facing the bristles of said brush seal and extending axially in order to carry the knife-edge seal or seals of the labyrinth seal.

The invention also relates to a turbine engine comprising an enclosure for lubricating the bearings of its rotating shaft or shafts, characterised in that the sealing of said enclosure against its environment is ensured by at least one device as described above. Finally, it relates to a turbine engine comprising an upstream enclosure and a downstream enclosure for lubricating the bearings of its rotating shaft or shafts, wherein the sealing of each of the enclosures is ensured by devices as described above.

It will be easier to understand the invention, and the other aims, details, features and advantages thereof will become clearer, from the following detailed, explanatory description of one or more embodiments of the invention given by way of purely illustrative, non-restrictive example, with reference to the attached diagrammatic drawings.

In these drawings:

DETAILED DESCRIPTION OF THE INVENTION

Figure 1:
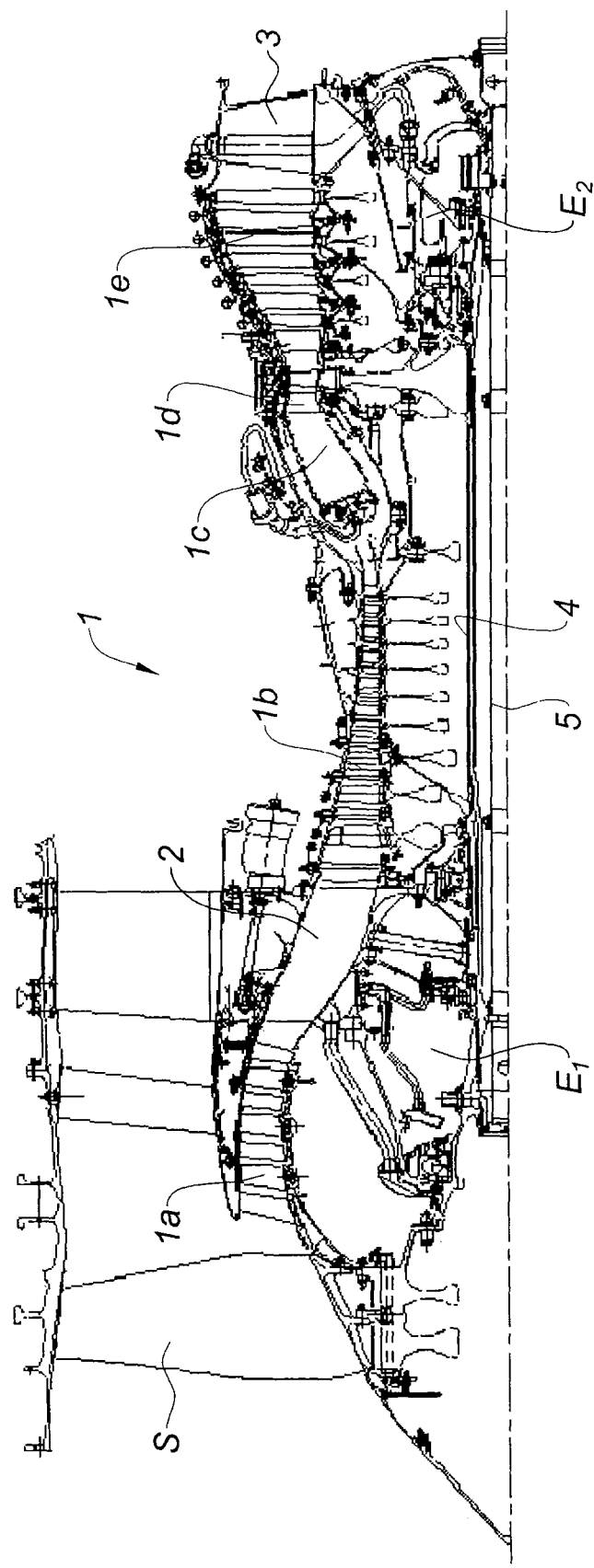
FIG. 1 is a view in section of a turbine engine according to the prior art.

Referring to FIG. 1, this shows a turbojet engine 1 of the prior art, conventionally comprising a fan S, a low-pressure compressor 1a, a high-pressure compressor 1b, a combustion chamber 1c, a high-pressure turbine 1d and a low-pressure turbine 1e. The high-pressure compressor 1b and the high-pressure turbine 1d are connected by a high-pressure shaft 4 and they and the shaft together form a high-pressure (HP) core. The low-pressure compressor 1a and the low-pressure turbine 1e are connected by a low-pressure shaft 5 and they and the shaft together form a low-pressure (LP) core. These bodies are carried by fixed structural parts, denoted as intermediate case 2, to support their bearings located upstream, and exhaust case 3, to support their bearings located downstream.

To lubricate these bearings and the gear systems of various power take-off shafts on the rotors, the latter are enclosed in enclosures, very nearly fluid-tight, which are formed by juxtaposition of fixed walls linked to the intermediate case 2 and the exhaust case 3 respectively, and of movable walls linked to the high- and low-pressure shafts. Thus, a turbine engine generally comprises an upstream enclosure E1 associated with the intermediate case 2 and a downstream enclosure E2 associated with the exhaust case 3. As stated previously these enclosures are bathed in an atmosphere containing oil for lubricating the various members and there is an air flow passing through them at a controlled flow rate, for ventilation purposes.

Figure 2:
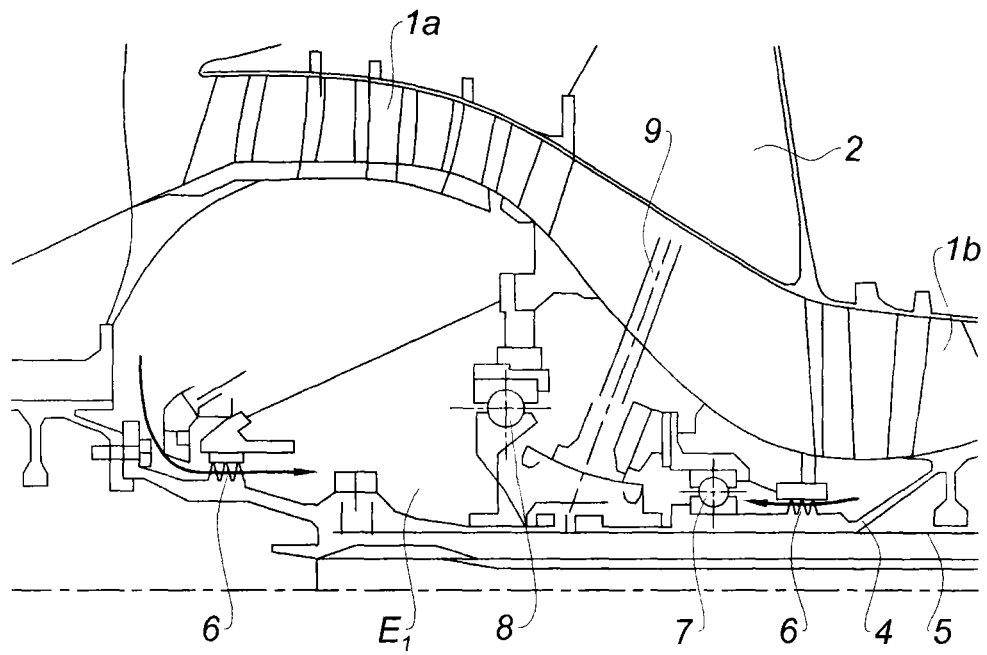
FIG. 2 is a view of a detail from FIG. 1, at the level of its front enclosure.

FIG. 2 shows, still for the prior art, the front portion of the turbine engine of FIG. 1, axially, at the level of the LP compressor 1a and the front enclosure E1. The intermediate case 2 is extended in the direction of the axis of rotation by partitions that form the fixed portion of the enclosure E1, while the HP shaft 4 and the LP shaft 5 form the rotating portion thereof. These two portions join to form the enclosure E1 at the level of labyrinths 6, which tend to reduce the circulation of air entering this enclosure as far as possible, particularly at high rotation speeds. On the figure, arrows indicate the direction of circulation of the air passing through the labyrinths 6. The enclosure E1, like the enclosure E2 of the exhaust case 3, is connected to the outside by what is known as a degassing pipe system, not shown in the figure, for discharging the air that has entered these enclosures and which, on leaving, is charged with an oil mist.

Inside the enclosure E1, thrust bearings are visible, as are the bearings of the HP shaft 4 and LP shaft 5 supporting them, given the references 7 and 8 respectively. FIG. 2 also shows a power take-off shaft 9 on the LP rotor 5, to which it is connected conventionally by pinions, the object of which is to drive the accessories operating on the engine or to provide power to the aircraft equipment that needs it.

Figure 3:
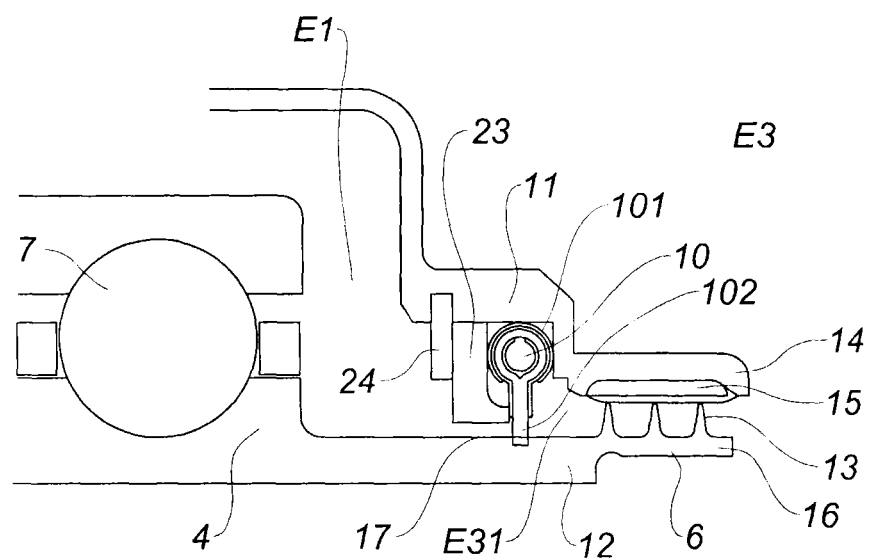
FIG. 3 is a view in section of a sealing device for a front enclosure, according to one embodiment of the invention.

In contrast, FIG. 3 shows a sealing device according to the invention, for an enclosure such as the upstream enclosure E1 illustrated. The same device can, of course, be put in place for a downstream enclosure E2. It is constituted by a brush seal 10, which is fitted in series with a labyrinth seal 6 analogous to those of the prior art that are illustrated in FIGS. 1 and 2.

The brush seal 10 is produced from a brush body 101, having the circular form of an annular torus, which is generally constituted by several sectors of crown. From this brush body 101 there extend bristles 102, carbon fibres in this particular case. which are arranged so as to rub against a rotating cowl 12 linked to the HP shaft 4. These sectors are held in place by a plate 23, which is shrunk on within an adjustment made in a fixed cylindrical wall 11 that belongs to the fixed portion of the enclosure E1 and therefore carries the brush seal. The fixed wall 11 has a first radial face and a second cylindrical face, between which the annular sectors constituting the brush body 101 are housed. It further comprises a circular groove made in the thickness of its cylindrical face, at a distance from the brush body corresponding to the axial thickness of said plate 23. A lock ring 24 is housed within this groove. The seal is thus held within the boring in the fixed wall 11 by the lock ring 24, which prevents the plate 23 from moving away and releasing the brush body 101.

According to the invention the rotating cowl 12, which is driven by the HP shaft 4, has a first cylindrical portion 17, oriented axially, against which the bristles 102 of the seal 10 rub, and is continued axially by an axial extension 16 carrying knife-edge seals 13 that are suitable for forming, together with an abradable material, a labyrinth 6 identical to those of the prior art. This axial extension 16 extends beyond the bristles 102 of the brush seal 10, in the opposite direction from that of the enclosure E1. Similarly, as concerns the fixed portion of the enclosure E1, the fixed wall 11 is extended axially, beyond the brush body 101, by a circular crown 14 facing the knife-edge seals 13, so as to form the labyrinth 6. Conventionally, this crown 14 carries on its inner face an abradable material 15 into which the knife-edge seals 13 sink so as to form a sealing joint.

Finally, the invention is distinguished from the prior art in that it positions two sealing joints in series between the enclosure E1 to be ventilated and an outer zone E3 that forms the environment of the enclosure E1. In this zone the pressure is equal to the internal pressure of the turbine engine 1 in the area of its intermediate case 2. A first seal located in the area of highest pressure is a labyrinth seal 6 while the second one, placed against the enclosure to be ventilated, is a brush seal 10. Between the two seals an intermediate zone E31 is formed, in which the pressure P31 is intermediate between the higher pressure P3 of the outer zone E3 and the lower pressure P1 of the enclosure E1.

To control the pressure P1 at all operating rotation speeds of the turbine engine, it is advisable to place two seals each constituted by a brush seal 10 associated with a labyrinth 6, at either end—upstream and downstream—of the enclosure E1. For reasons of consistency in controlling pressures in the enclosures, a similar device is preferably also positioned at either end of the downstream enclosure E2.

Figure 4:
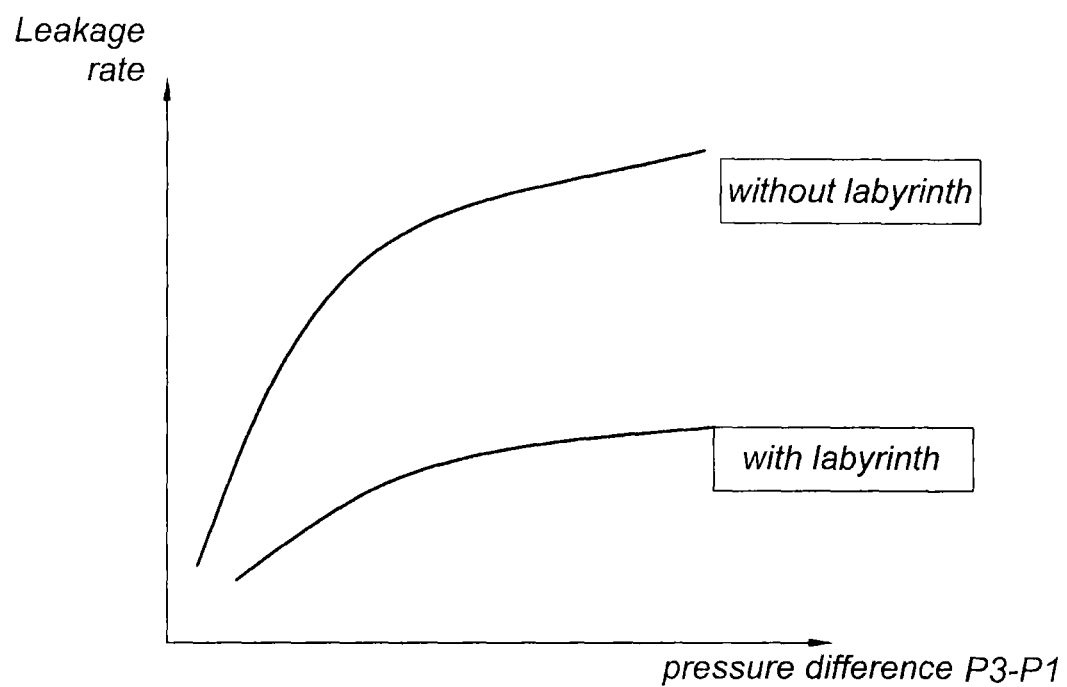
FIG. 4 shows the gain brought by the invention expressed as the leakage rate achieved through the enclosure of FIG. 3, according to the prior art and according to the invention.

FIG. 4 shows the contribution made by the invention, showing in a single, dimensionless diagram the course of the pressure P1 within the enclosure E1 when the operating rotation speed of the turbine engine 1 varies between idling and full-out, in other words when the internal pressure P3 increases progressively. This course is shown first, in the case of sealing joints of the prior art, that is, those constituted by simple brush seals without a labyrinth, positioned at either end of the enclosure and, secondly, by sealing joints according to the invention, that is, a labyrinth seal 6 positioned in series with a brush seal 10, at either of these ends.

In the case of the prior art (top curve), the leakage rate, i.e. that passing through the enclosure E1, increases rapidly with the pressure difference P1–P3, whereas in the case of the invention (bottom curve) this leakage rate increases markedly more slowly. In this way the invention ensures that a low leakage level is preserved, but one consistent nevertheless with the demands of cooling the enclosure at all rotation speeds and therefore that the efficiency losses currently associated with high rotation speeds are reduced.

A description will now be given of the functioning of a sealing device according to the invention.

The solution proposed is a combination of a labyrinth seal 6 and a brush seal 10 with carbon bristles, positioned in series with one another.

The labyrinth seal is the simplest, strongest and most widespread sealing solution for turbine engines but its effectiveness is less than so-called advanced sealing devices such as the brush seal. As for the carbon brush seal 10, it is also known to be very flexible and therefore allows the seal to adapt very well to defects in the parts, even when these are large. However, the fault of this very flexible seal is that it quickly loses its effectiveness when the pressure differences between the cavities to be sealed are high (as illustrated in FIG. 4). On the other hand it offers very high-performance sealing at very low to medium pressures, while remaining relatively simple and strong.

Since the major drawback of the brush seal is nonetheless its mediocre sealing ability at high pressures, this weakness is corrected, in the invention, by putting a labyrinth seal in series with the brush seal. The addition of a labyrinth 6 to a carbon brush seal 10 allows the brush seal, through the pressure drop created by the knife-edge seal or seals 13 of the labyrinth, to operate at maximum efficiency, thereby producing sealing at all rotation speeds that is better than that achieved with each of the individual solutions, while preserving limited overall dimensions and cost. The most significant improvement is achieved when a first knife-edge seal 13 is added upstream of a single brush seal 10; the addition of further knife-edge seals (as illustrated in FIG. 3) or further brush seals admittedly allows the effectiveness of sealing to be increased, but marginally, and at the expense of greater overall dimensions and cost. The recommended solution is therefore to opt for one labyrinth seal with a single knife-edge seal.

FIG. 4 shows that a carbon brush seal 10 is only highly effective, i.e. has a consistently low leakage rate, when the pressure difference P3–P1 between the two cavities to be sealed is low. This effectiveness subsequently falls, through an unwanted increase in the leakage rate, when the pressure difference between the two cavities rises. This fall in effectiveness is explained by the fact that the pressure difference leads to an effort from the air on the brush seal 10, oriented in the direction of the air flow. This effort causes the bristles 102 of the brush to flex, since they have intentionally been chosen to be relatively flexible in order to adapt to defects in the parts to be sealed. And the greater the flexion of the brush bristles, the greater the leakage. If the brush seal 10 is to retain its good performance, the flexion of the bristles 102 would have to be less. Therefore, since the brush bristles cannot be made more rigid, the invention proposes to reduce the effort to which they are subjected, by adding a labyrinth seal 6 with one or more knife-edge seals 13. In practice, it is noted that a labyrinth with a single knife-edge seal is enough to produce a significant pressure drop. The invention proposes preferably placing the brush seal 10 alongside the lubricated enclosure E1, in other words, pneumatically downstream of the labyrinth seal 6; on the one hand this allows the carbon brush seal to work within its preferential operating range and, on the other hand, it allows the bristles 102 of the brush that are in contact with the rotor 4 to benefit from the lubricating and coolant effect of the oil-laden air. As for the labyrinth 6, which is positioned on the side opposite the lubricated enclosure E1, that is, on the high-pressure side, this operates within its rated operating range.

This type of double seal, constituted by a carbon brush seal 10 associated with a labyrinth seal 6, and positioned pneumatically downstream of the latter, has been described for an enclosure E1 for lubricating bearings and gears, but this configuration can clearly be applied to other rotor/stator sealing devices of the turbine engine; it can also be applied to rotor/rotor or even stator/stator sealing devices. In particular, it can be put in place in order to seal air/air cavities, air/oil cavities and, in general, cavities containing gases, liquids or a mixture of the two.

The invention claimed is:

1. A sealing device for an enclosure for lubricating bearings of a rotating shaft of a turbine engine formed by an assembly of at least one of juxtaposed rotating or static bodies, the sealing device comprising:
   a brush seal having a brush body, carried by a first member, and bristles extending from said brush body and arranged so as to rub against a second member rotatable relative to the first member, so as to produce a pressure difference between an inside of said enclosure and an outer environment thereof; and
   a labyrinth-type seal having at least one knife-edge seal extending from said first or second member and cooperating with an abradable material carried respectively by said second or first member, said labyrinth seal being positioned in series with said brush seal between the inside of said enclosure and the outer environment thereof,
   wherein a leakage flow of gases passes through said sealing device,
   wherein the labyrinth seal is provided entirely on a side positioned upstream the leakage flow and having a higher pressure between the inside of said enclosure and the outer environment of said enclosure, and
   wherein said labyrinth seal is provided upstream said brush seal, the at least one knife-edge seal of the labyrinth seal being provided so as to provide a pressure drop downstream said labyrinth seal, to reduce the effort and flexion to which said bristles of said brush seal are subjected, thereby causing said brush seal to operate at maximum efficiency, thereby producing sealing at all speeds of the shaft,
   wherein the first member is a fixed cylindrical wall delimiting a fixed portion of the enclosure, the second member is a high-pressure shaft connected to a high-pressure compressor and a high-pressure turbine, and the knife-edge seal extends from the high-pressure shaft, and the abradable material is carried by the fixed cylindrical wall,
   wherein said fixed cylindrical wall has a boring within which the brush body is positioned, and an axial extension forming a circular crown carrying said abradable material, an inner diameter of the boring being greater than an inner diameter of the crown,
   wherein the high-pressure shaft includes a cylindrical face positioned facing the bristles of said brush seal and extending axially in order to carry the knife-edge seal of the labyrinth seal at a free end of the high-pressure shaft,
   wherein a zone having an intermediate pressure is provided between the labyrinth seal and the brush seal, the intermediate pressure being greater than a pressure of the enclosure and less than a pressure of the outer environment of the enclosure, and
   wherein a outer diameter of the high-pressure shaft in the zone having the intermediate pressure is equal to an outer diameter of the cylindrical face of the high-pressure facing the bristles of said brush seal and is equal to an outer diameter of the high-pressure shaft in a section of the enclosure adjacent to the brush seal.

2. The device according to claim 1, wherein the brush seal is a seal with carbon bristles.

3. The device according to claim 1, wherein the labyrinth seal has only one knife-edge seal.

4. A turbine engine comprising:
   at least one enclosure for lubricating bearings of a rotating shaft thereof, wherein the sealing of said enclosure against an environment thereof is ensured by at least one a sealing device formed by an assembly of at least one of juxtaposed rotating or static bodies, the sealing device comprising:
   a brush seal having a brush body, carried by a first member, and bristles extending from said brush body and arranged so as to rub against a second member rotatable relative to the first member, so as to produce a pressure difference between an inside of said enclosure and an outer environment thereof; and
   a labyrinth-type seal having at least one knife-edge seal extending from said first or second member and cooperating with an abradable material carried respectively by said second or first member, said labyrinth seal being positioned in series with said brush seal between the inside of said enclosure and the outer environment thereof,
   wherein a leakage flow of gases passes through said sealing device,
   wherein the labyrinth seal is provided entirely on a side positioned upstream the leakage flow and having a higher pressure between the inside of said enclosure and the outer environment of said enclosure,
   wherein said labyrinth seal is provided upstream said brush seal, the at least one knife-edge seal of the labyrinth seal being provided so as to provide a pressure drop downstream said labyrinth seal, to reduce the effort and flexion to which said bristles of said brush seal are subjected, thereby causing said brush seal to operate at maximum efficiency, thereby producing sealing at all speeds of the shaft,
   wherein the first member is a fixed cylindrical wall delimiting a fixed portion of the enclosure, the second member is a high-pressure shaft connected to a high-pressure compressor and a high-pressure turbine, and the knife-edge seal extends from the high-pressure shaft, and the abradable material is carried by the fixed cylindrical wall,
   wherein said fixed cylindrical wall has a boring within which the brush body is positioned, and an axial extension forming a circular crown carrying said abradable material, an inner diameter of the boring being greater than an inner diameter of the crown,
   wherein the high-pressure shaft includes a cylindrical face positioned facing the bristles of said brush seal and extending axially in order to carry the knife-edge seal of the labyrinth seal at a free end of the high-pressure shaft,
   wherein a zone having an intermediate pressure is provided between the labyrinth seal and the brush seal, the intermediate pressure being greater than a pressure of the enclosure and less than a pressure of the outer environment of the enclosure, and
   wherein a outer diameter of the high-pressure shaft in the zone having the intermediate pressure is equal to an outer diameter of the cylindrical face of the high-pressure facing the bristles of said brush seal and is equal to an outer diameter of the high-pressure shaft in a section of the enclosure adjacent to the brush seal.

5. The turbine engine according to claim 4, wherein the brush seal is a seal with carbon bristles.

6. The turbine engine according to claim 4, wherein the labyrinth seal has only one knife-edge seal.

7. The turbine engine according to claim 4, wherein the leakage flow of gases is provided by a compressor of the turbine engine.

8. The turbine engine according to claim 4, comprising an upstream enclosure and a downstream enclosure for lubricating bearings of a rotating shaft thereof, wherein the sealing of each of the enclosures is ensured by a sealing device.

9. The device according to claim 1, further comprising a plate which holds a brush body of the brush seal in place, and a lock ring which holds the plate in place, the lock ring being housed in a groove provided in the boring.

10. The device according to claim 9, wherein the brush body is an annular torus constituted of several sectors.

* * * * *